April 13, 1965  M. B. CORNWALL ETAL  3,178,556
APPARATUS FOR WELDING MASKING NEGATIVES
Filed May 29, 1962  2 Sheets-Sheet 2
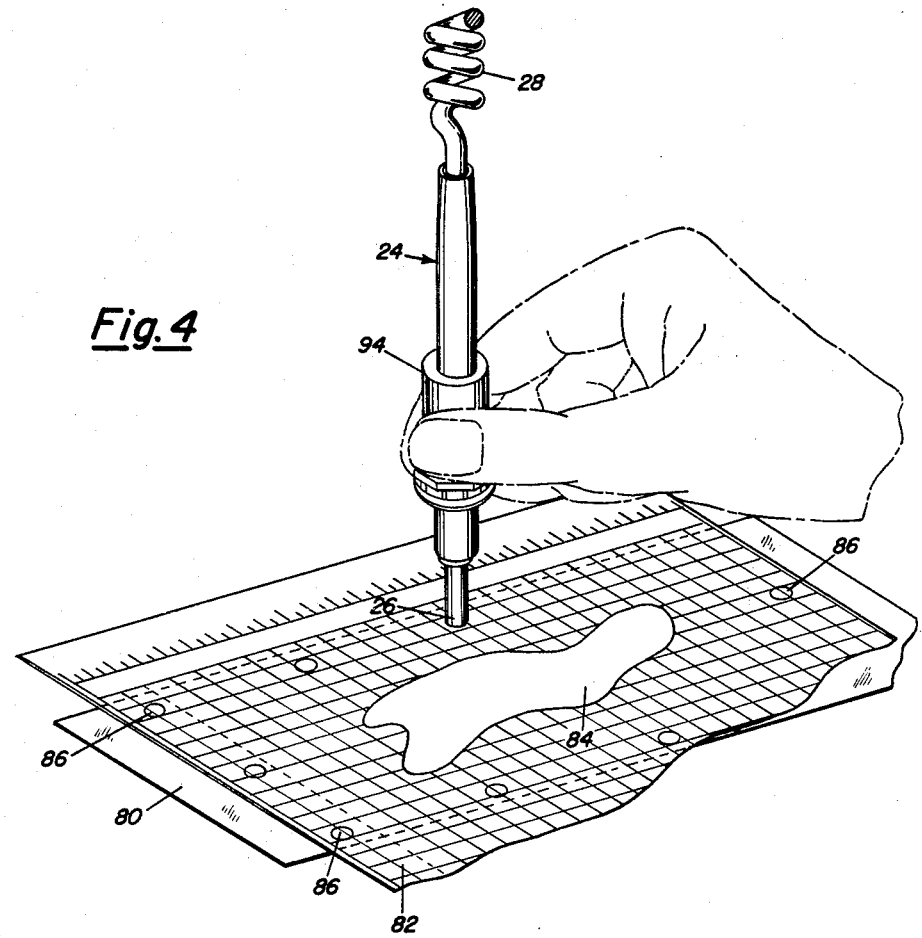
Fig. 4
Fig. 5
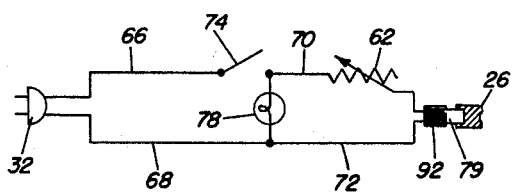
INVENTORS
MONTGOMERY B. CORNWALL
BY  ROBERT L. WILLIAMSON
ATTORNEYS 3,178,556
APPARATUS FOR WELDING MASKING NEGATIVES
Montgomery B. Cornwall, 3644 S. Granada Ave., Spring Valley, Calif., and Robert L. Williamson, 303 N. 47th St., San Diego, Calif.
Filed May 29, 1962, Ser. No. 198,618
1 Claim. (Cl. 219—200)

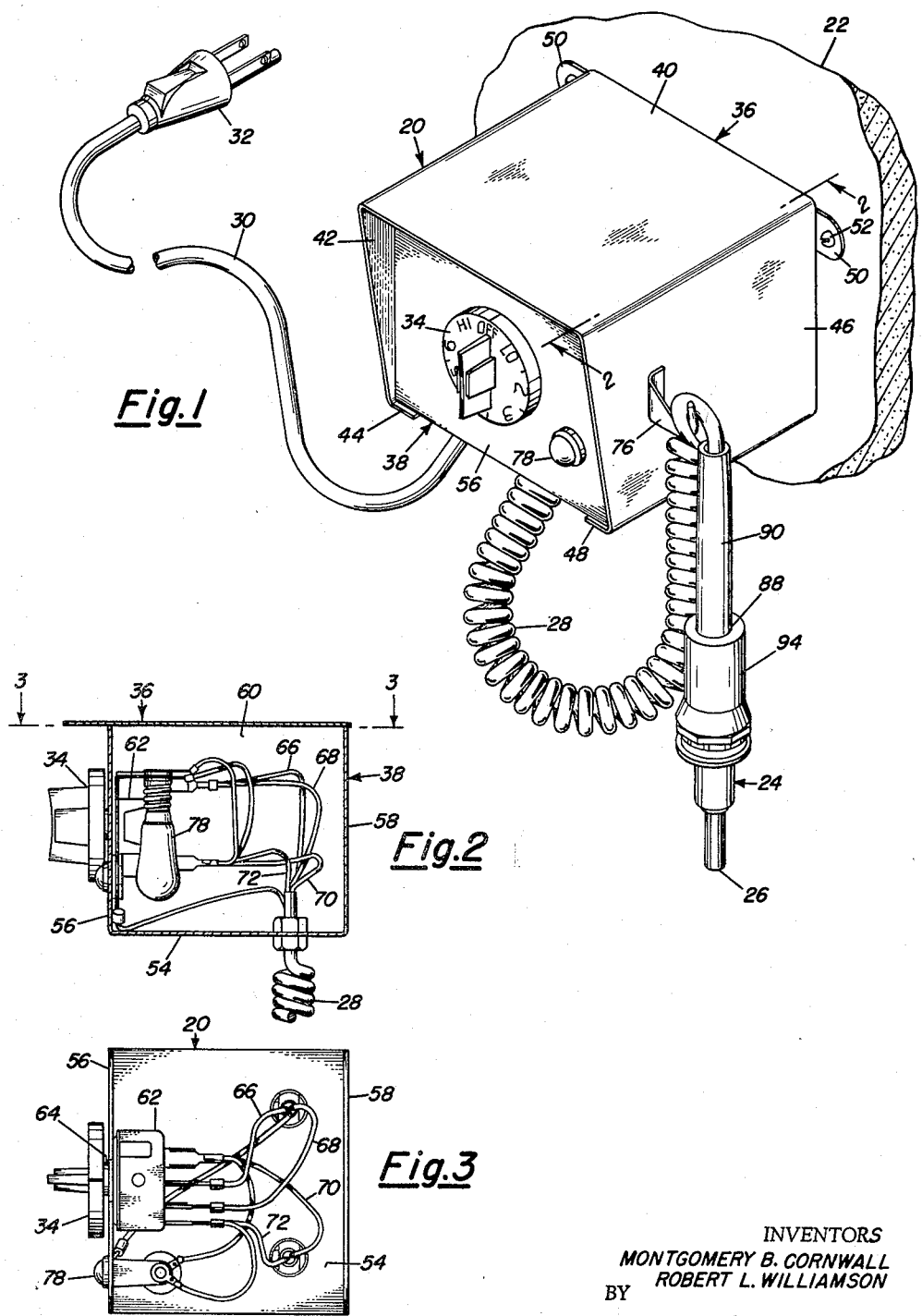

The present invention relates to a process of masking negatives of the film type and to the apparatus for carrying out that process.

Negatives of the film type are masked by placing the negative on a transparent or translucent surface of a light projecting table. A mask is then superimposed on the film and then the mask is fastened to the film.

In carrying out the process of the present invention, a mask is employed of the type having the characteristic of being capable of being welded to the film by the application of heat. In practicing the present invention, an electrically heated welder is employed and is used to weld the mask to the film in spots.

The welding apparatus comprises a chassis formed of two major sections. One of these sections forms three sides of a casing. The section includes means in the form of integrally formed ears for fastening the chassis to a suitable support such as a wall. This section also includes an open top hook. The other section forms the other three sides of the casing. A rheostat of the variable type is disposed within the chassis and supported by one of the walls of the second mentioned section of the chassis. This wall of the second mentioned section is provided with an opening through which a shaft of the rheostat extends. A control knob is carried by the shaft exteriorly of the chassis and used for turning the shaft for adjusting the resistance of the rheostat. Wires extend through one of the walls of the second mentioned section of the chassis for connecting the rheostat with a source of electric current, and other wires are connected with the rheostat and extend through a wall of the second mentioned chassis for connecting the rheostat with an electrical resistor, the latter being employed for generating heat. The hook on the first mentioned section of the chassis is utilized for supporting the resistor through the wires which connect the latter with the rheostat.

Other features and advantages of the present invention will be apparent from the following description, reference being had to the accompanying drawings wherein a preferred embodiment of the invention is illustrated.

In the drawings:

FIG. 1 is a perspective view of the improved welding apparatus, showing the same attached to a wall;

FIG. 2 is a sectional view taken along line 2—2 of FIG. 1;

FIG. 3 is a view looking in the direction of arrows 3 of FIG. 2;

FIG. 4 is a perspective view showing the negative and the mask with the heating element being applied thereto; and FIG. 5 is a diagrammatic view of the electrical system employed.

Referring more in detail to the drawings, the heating or welding apparatus is shown as comprising a chassis 20 attached to a wall 22. The heating or welding apparatus is shown at 24. This welding apparatus includes a welder tip 26. The welder 24 is connected by a cable 28 to a rheostat disposed within the chassis 20. A cable 30 connects the rheostat with a source of electric current through a plug 32. A knob 34 is disposed on the front of the chassis and is used for adjusting the rheostat.

The chassis 20 includes two main sections 36 and 38. The section 38 includes a top wall 40, a left side wall 42, a left bottom flange 44, a right side wall 46, a bottom flange 48 and two integrally formed ears 50. These ears are utilized for securing the chassis to the wall 22 through screws 52. The section 38 includes a bottom wall 54, a front wall 56, and a rear wall 58. These sections may be secured to one another in any suitable manner as, for example, by screws (not shown) which extend through the flanges 44 and 48, and screwed into the bottom wall 54. Thus the two sections 36 and 38 form a closed casing 60.

The front wall 56 of the section 38 carries a rheostat 62. This front wall is provided with an opening and the control shaft 64 of the rheostat extends through this opening and the front end of the shaft carries the knob 34.

The circuit to the rheostat is preferably of the three-wire type. However, for simplicity it is shown as comprising only two wires in the diagrammatic showing. The cable 30 includes wires 66 and 68, and the apparatus is controlled by a switch 74. The cable 28 includes wires 70 and 72. Upon closing of the switch 74 the current is conducted from the source of current through the wire 66, switch 74, wire 70, rheostat 62, resistor 24 and wires 72 and 68 to the other side of the source of current. A lamp 78 is arranged in parallel circuit relationship with the resistor 24. Of course, the lamp will indicate when the switch is closed and also, should the resistor be destroyed, the light value of the lamp is materially increased to indicate the non-functioning of the resistor.

The first mentioned section 36 of the chassis also carries a hook 76 which is utilized for supporting the resistor 24 through the cable 28, as is clearly shown in FIG. 1.

Referring now to FIG. 4, the negative in the form of a cellulose base film is shown at 80 and the mask is shown at 82. These two elements conjointly have the characteristic of being capable of being welded to one another by the application of heat of a certain high value. As previously stated, the negative is a cellulose base film and preferably the mask is formed of paper having a clay coating on the under side. One example of such mask is manufactured by Sinclair & Valentine Co., of 611 West 129th Street, New York, New York, and bears the notation "Multi 1250 ATF15 Davidson 221."

Let us assume that the area 84 of the film is to be reproduced. Then the film is placed on a suitable transparent or translucent surface of a light table. This light table is well known in the art and need not be illustrated here. Then the mask 82 is placed in the proper position over the negative film, longitudinal and transverse lines being provided on the mask for properly locating the same with respect to the film. The operator then with one hand will hold the mask in proper position upon the negative and, with the other hand, apply the welder tip 26 to the various spots of the mask to cause cohesion or welding of the mask to the negative film. Several of said spots are shown at 86. It is highly desirable that the end of the welding tip be flat. Thus there has been provided a simple manner of connecting the mask and the film.

Referring more in detail to the handle end 88 of the welder, it comprises an insulated sleeve 90 which carries a threaded socket 92. This threaded socket carries the resistor 24. This resistor is exteriorly threaded and the welding tip 26 is interiorly threaded for fastening same in high heat conducting relationship with the resistor 24. Thus the heating element 24 can readily be removed and replaced and likewise the tip 26 can be removed and replaced. The lower part of the insulated sleeve carries a heat insulator in the form of cork 94, which insulator 94 is used for manipulating the welder, as is more clearly shown in FIGURE 4.

While the form of embodiment herein shown and described constitutes a preferred form, it is to be understood that other forms may be adopted falling within the scope of the claim that follows.

We claim:

An electric heating apparatus for welding a masking sheet to a film, comprising in combination:

(A) A rectangularly shaped chassis including:
- (a) a section forming the top wall and two opposite side walls of a casing, the rears of the two side walls of said section including
- (b) vertically extending ears for securing same to a vertical support, and including
- (c) an open top hook carried by one of the side walls,
- (d) said chassis also including a second section forming the front, bottom and rear walls of the casing;

(B) a rheostat disposed within the chassis;
- (e) means supporting the rheostat on the front wall of the second mentioned section of the chassis,
- (f) said front wall of the second mentioned section having an opening;
- (g) said rheostat having a control shaft extending through said opening;
- (h) a control knob on said shaft and disposed outside of said chassis;
- (i) wires extending through one of the walls of the second mentioned section of the chassis and connected with the rheostat for connecting the latter with a source of electric current;

(C) an electrical resistor for generating heat;
- (j) wires extending through bottom wall of the second mentioned section and connected with the rheostat and the resistor,
- (k) said hook forming a support for the resistor through the last mentioned wire.

References Cited by the Examiner

UNITED STATES PATENTS

| | | | |
|---|---|---|---|
| 1,689,004 | 10/28 | Ackley | 219—222 X |
| 1,927,744 | 9/33 | Jones. | |
| 2,365,576 | 12/44 | Meaker | 219—384 |
| 2,455,453 | 12/48 | Varnum | 219—236 |
| 2,494,840 | 1/50 | Stephenson | 219—231 |
| 2,538,580 | 1/51 | Meaker | 219—384 |
| 2,550,748 | 5/51 | Woltz | 219—231 |
| 2,554,160 | 5/51 | Von Gunten | 156—290 |
| 2,973,421 | 2/61 | Clark | 219—540 |
| 2,999,042 | 9/61 | Meister | 156—290 |
| 3,045,336 | 7/62 | Northrop et al. | 219—227 X |

RICHARD M. WOOD, *Primary Examiner.*